(12) United States Patent
Smith (10) Patent No.: US 6,776,952 B2
(45) Date of Patent: Aug. 17, 2004

(54) METHOD AND APPARATUS FOR MAKING FLEXIBLE SHEET PRODUCTS FOR ABSORBING LIQUIDS

(75) Inventor: David Smith, Orange Beach, AL (US)

(73) Assignee: Spill Tech Industries, Inc., Mobile, AL (US)

(*) Notice: Subject to any disclaimer, the term of this patent is extended or adjusted under 35 U.S.C. 154(b) by 211 days.

(21) Appl. No.: 10/058,878

(22) Filed: Jan. 28, 2002

(65) Prior Publication Data

US 2002/0130443 A1 Sep. 19, 2002

Related U.S. Application Data

(63) Continuation-in-part of application No. 09/726,828, filed on Nov. 30, 2000, now Pat. No. 6,616,889.

(51) Int. Cl.[7] .............................. B27N 3/00; A61F 13/15
(52) U.S. Cl. ....................... 264/518; 425/83.1; 156/167
(58) Field of Search ....................... 264/518; 425/83.1; 156/167

(56) References Cited

U.S. PATENT DOCUMENTS

| | | | |
|---|---|---|---|
| 2,571,334 A | * | 10/1951 | Browne ...................... 264/518 |
| 4,100,324 A | | 7/1978 | Anderson et al. |
| 4,375,446 A | | 3/1983 | Fujii et al. |
| 4,813,948 A | | 3/1989 | Insley |
| 4,933,229 A | | 6/1990 | Insley et al. |
| 5,080,956 A | | 1/1992 | Smith |
| 5,256,466 A | | 10/1993 | Berringan et al. |
| 5,503,782 A | | 4/1996 | Dyrud et al. |
| 5,597,418 A | | 1/1997 | Evans, Jr. et al. |
| 6,080,344 A | * | 6/2000 | Thorbjornsson .............. 264/83 |
| 6,616,889 B2 | * | 9/2003 | Smith ......................... 264/518 |

* cited by examiner

Primary Examiner—Mary Lynn Theisen
(74) Attorney, Agent, or Firm—Buchanan Ingersoll PC (57) ABSTRACT

An apparatus is provided for manufacturing a flexible sheet product having liquid absorbent qualities. The apparatus generally includes first and second competing vacuum systems pulling air in substantially opposite directions into first and second oppositely rotating screens, respectively. A molten polymer-based material, which is blown into the first and second competing vacuum systems, is pulled in substantially opposite directions onto the first and second oppositely rotating screens. The liquid polymer-based material fiberizes as it is being pulled apart by the competing vacuum systems creating a web of fibrous material which cures to develop the flexible sheet product having liquid absorbent qualities.

25 Claims, 6 Drawing Sheets

METHOD AND APPARATUS FOR MAKING FLEXIBLE SHEET PRODUCTS FOR ABSORBING LIQUIDS

CROSS-REFERENCE TO RELATED APPLICATIONS

This application is a continuation-in-part application of application Ser. No. 09/726,828 entitled "Method and Apparatus for Making Flexible Sheet Products for Absorbing Liquids", filed Nov. 30, 2000 now U.S. Pat. No. 6,616,889, the entire disclosure of which is herein incorporated by reference.

FIELD OF THE INVENTION

The present invention is directed toward a flexible sheet product for absorbing liquids and, more particularly, toward a method and apparatus for making a non-woven flexible sheet product for absorbing liquids using melt-blown microfibrous materials.

BACKGROUND OF THE INVENTION

The general principal in "melt-blowing" technology is to blow, or spray, a molten thermoplastic polymer or resin onto a moving screen. Typically, the thermoplastic polymer is extruded through rows of small, side-by-side orifices into a high-velocity gaseous stream where the extruded material is attenuated and drawn into microfibers. The turbulence created by the high-velocity gaseous stream entangles the microfibers to form a web of fibrous material that is deposited onto a collector, such as a moving screen. The screen includes a vacuum system behind it which sucks, or pulls, the molten polymer onto the screen. The vacuum system controls the amount of loft and the tightness, or strength, of the absorbent sheet product. The higher the vacuum applied, the less loft the product will have, but the tighter, and hence stronger, the product will be. As the vacuum decreases, the absorbent sheet product will exhibit more loft, but will generally become weaker. Typically, as the loft of the product decreases, so does its liquid absorption qualities.

In prior art melt-blown technologies, the molten polymer is sprayed onto a single moving screen at an angle that is generally perpendicular to the moving screen. A vacuum behind the screen pulls the sprayed polymer onto the screen as the molten polymer fiberizes and cures to form a flexible sheet product for absorbing liquids. Controlling the loft, and thus the absorption qualities, of the finalized product is effectuated by adjusting the amount of vacuum applied behind the screen and/or moving the sprayer closer to or further from the moving screen.

With these prior art, melt-blown technology processes, there is generally a limit as to the thickness of the product that can be obtained, while still exhibiting good loft and strength qualities. If a thicker product is desired, a first sheet product is manufactured and wound on a "put up" roll or otherwise temporarily stored. A second sheet product is then similarly manufactured and the first sheet product is unrolled, with the two bonded together using ultrasonic bonding, or other means of bonding absorbent sheet products together. Making such multiple layer sheet products are generally time consuming and costly.

The present invention is directed to overcoming one or more of the above-mentioned problems.

SUMMARY OF THE INVENTION

An apparatus is provided for manufacturing a flexible sheet product having liquid absorbent qualities. The apparatus generally includes first and second competing vacuum systems pulling air in substantially opposite directions into first and second moving screens, respectively. A molten polymer-based material, which is blown into the first and second competing vacuum systems, is pulled in substantially opposite directions onto the first and second moving screens. The liquid polymer-based material fiberizes as it is being pulled apart by the competing vacuum systems creating a web of fibrous material which cures to develop the flexible sheet product having liquid absorbent qualities.

Preferably, the molten polymer-based material is pulled onto the first and second moving screens at an angle other than 90° relative thereto. The first and second moving screens may be made of polyester or steel.

The apparatus may further include first and second roller assemblies operational with the first and second moving screens, respectively, providing for the movement of the first and second screens in opposite rotational directions. The first and second screens are displaced in close proximity to one other defining a loft zone therebetween. The molten polymer-based material is blown toward the loft zone, and onto the first and second screens, generally in the center where the first and second screens are moving together. The molten polymer-based material blown into the loft zone is acted upon by the first and second competing vacuum systems and pulled in substantially opposite directions onto the first and second screens forming a flexible sheet product exhibiting liquid absorbent qualities.

In one form, each of the first and second roller assemblies includes drive rollers for adjusting the rotational speeds of the first and second screens.

In an alternate embodiment, the first and second moving screens include first and second condensers rotating in opposite rotational directions.

A method is also provided for manufacturing a flexible sheet product exhibiting liquid absorbent qualities. The method generally includes providing first and second screens moving in opposite rotational directions. First and second vacuums are provided behind the first and second screens, respectively, the first and second vacuums pulling air into the first and second screens, respectively. A loft zone is created between the first and second screens wherein air is pulled in substantially opposite directions. A molten polymer-based material is blown into the loft zone and pulled in opposite directions by the first and second vacuums onto the first and second screens, respectively, developing a web of fibrous material. The web of fibrous material is cured to develop the flexible sheet product exhibiting liquid absorbent qualities.

In one form of the inventive method, the web of fibrous material is developed and cured substantially simultaneously.

It is an object of the present invention to provide a reduced cost, flexible sheet product for absorbing liquids.

It is a further object of the present invention to produce a flexible sheet product for absorbing liquids having desired loft and tightness specifications, while eliminating the process of making "put up" rolls to achieve a desired product thickness.

It is yet a further object of the present invention to produce a flexible sheet product for absorbing liquids having improved loft and tightness qualities.

It is still a further object of the present invention to provide an apparatus for making flexible sheet products for absorbing liquids which offers improved loft controllability of the resultant flexible sheet product.

Other aspects, objects, and advantages of the present invention can be obtained from a study of the application, the drawings, and the appended claims.

DETAILED DESCRIPTION OF THE INVENTION

Figure 1:
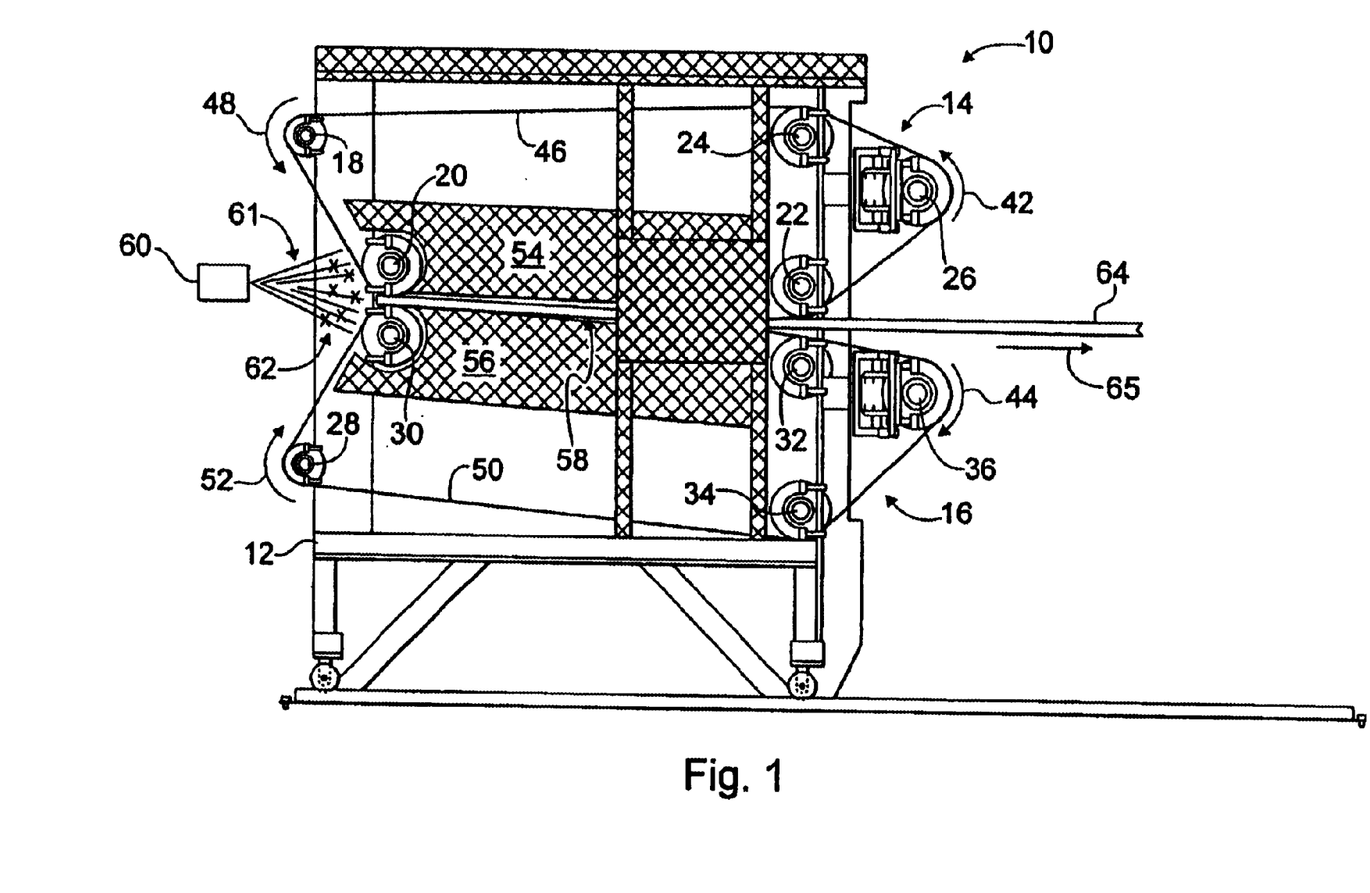
FIG. 1 is a side view of an apparatus for producing a flexible sheet product for absorbing liquids according to the present invention.
Figure 2:
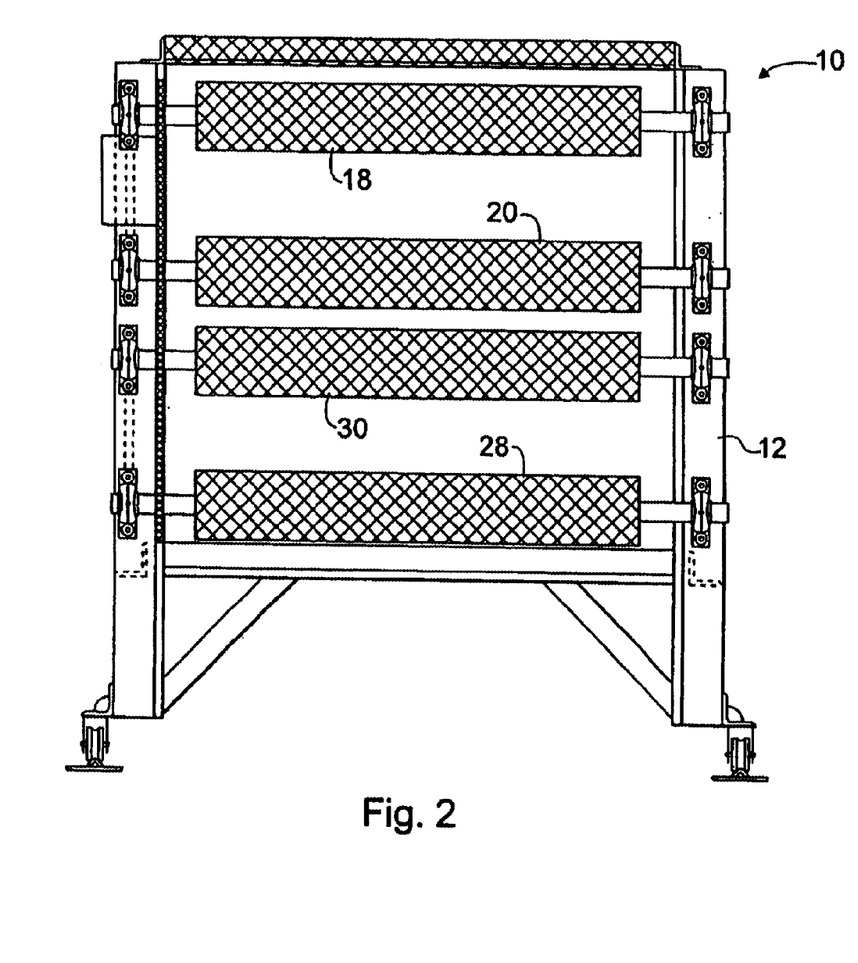
FIG. 2 is a front view of the inventive apparatus shown in FIG. 1.
Figure 3:
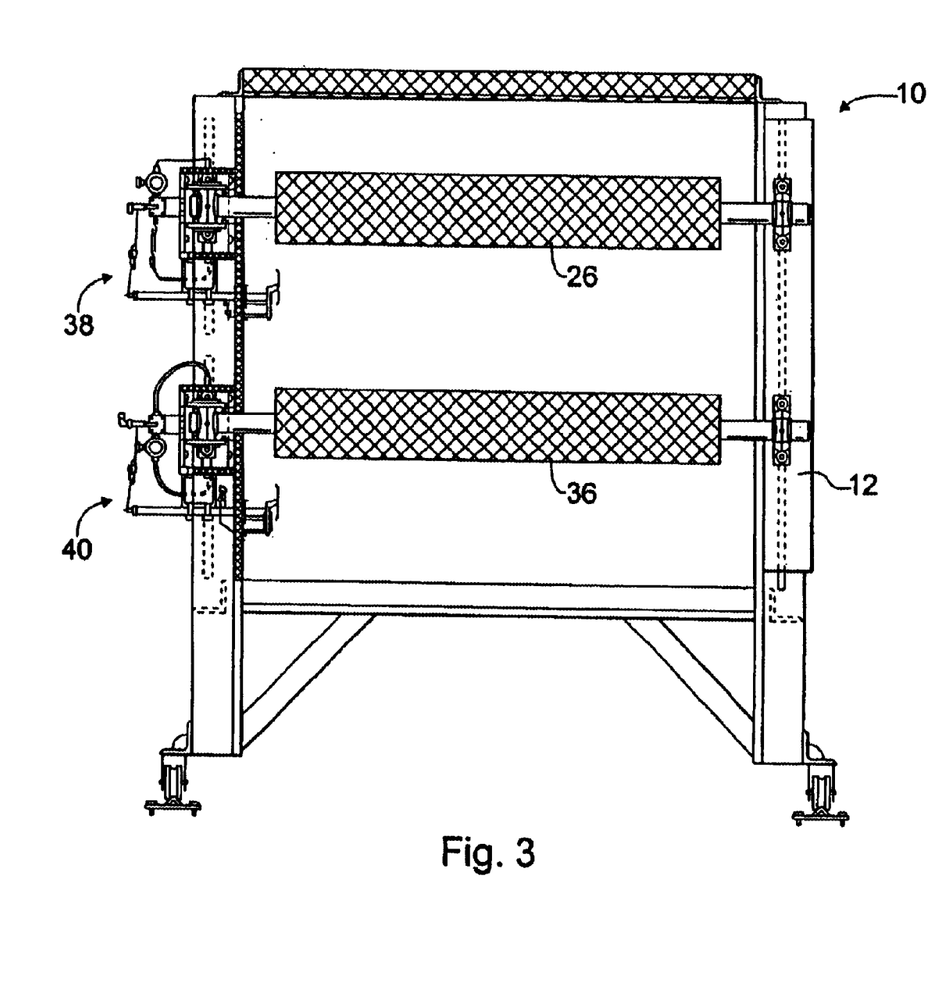
FIG. 3 is a back view of the inventive apparatus shown in FIG. 1.

Referring to FIGS. 1–3, an apparatus, shown generally at 10, for making flexible sheet products for absorbing liquids is disclosed. While the flexible sheet product has particular utility in absorbing oil-based liquids, it may be utilized in applications where absorption of other types of liquids is required. The apparatus 10 includes a frame 12 supporting first 14 and second 16 roller assemblies. The first roller assembly 14 includes rollers 18, 20, 22 and 24, and a drive roller 26. Similarly, the second roller assembly 16 includes rollers 28, 30, 32 and 34, and a drive roller 36. The drive rollers 26 and 36 are controlled by drive motors 38 and 40, respectively, for rotation in the directions indicated by arrows 42 and 44, respectively. Preferably, each of the rollers 18, 20, 22, 24, 28, 30, 32 and 34, and the drive rollers 26 and 36 are adjustably mounted to the frame 12.

A first screen 46 is operably connected to the first roller assembly 14 for rotational movement about the first roller assembly 14 in the direction indicated by arrows 42 and 48. Similarly, a second screen 50 is operably connected to the second roller assembly 16 for rotational movement about the second roller assembly 16 in the direction indicated by arrows 44 and 52. As can been seen in FIG. 1, the first 46 and second 50 screens move in opposite rotational directions. Preferably, the first 46 and second 50 screens are made of polyester or steel and are approximately 30-mesh. However, other materials and mesh values may be utilized for the screens without departing from the spirit and scope of the present invention.

First 54 and second 56 vacuum systems are provided behind the first 46 and second 50 screens, respectively. The first 54 and second 56 vacuum systems pull, or suck, air into the first 46 and second 50 screens, respectively. The first 46 and second 50 screens are preferably positioned one on top of the other creating a loft zone, shown generally at 58, therebetween where air is pulled in substantially opposite directions. The loft zone 58 extends generally from a point where the first 46 and second 50 screens come together at the rollers 20 and 30, i.e., the entrance to the loft zone 58, to a point along the moving screens 46 and 50 where a vacuum is no longer applied by the first 54 and second 56 vacuum systems. In a preferred form, the first 46 and second 50 screens are moving in a substantially parallel lateral direction while in the loft zone 58.

A conventional sprayer 60 sprays, or blows, a molten polymer-based material 61 toward the first 46 and the second 50 moving screens at the entrance to the loft zone 58. More specifically, the sprayer 60 includes rows of small, side-by-side orifices (not shown) through which the molten polymer-based 61 material is extruded. The molten polymer-based material 61 is extruded out of the sprayer 60 into a high velocity gaseous stream, also provided by the sprayer 60, which attenuates the emerging polymer into microfibers. The sprayer 60 may also apply water to the molten polymer stream.

The high velocity gaseous stream creates a turbulence which entangles the microfibers to form a web of fibrous material, shown generally at 62. The web of fibrous material 62 is deposited onto the first 46 and second 50 moving screens via the suction created by the first 54 and second 56 vacuum systems, respectively. Since the first 46 and second 50 screens are moving toward the loft zone 58 at an angle, the web of fibrous material 62 is pulled onto the first 46 and second 50 screens at an angle generally other than 90° relative thereto. By adjusting the position of rollers 18, 20, 28 and 30 on the frame 12, this angle may be changed. As the web of fibrous material 62 enters the loft zone 58 it is pulled in substantially opposite directions by the first 54 and second 56 vacuums with some of the fibers ending up on the first screen 46 and some ending up on the second screen 50, while at the same time remaining thermally linked together. As the thermally linked fibrous material moves through the loft zone 58, it cures to form a flexible sheet product for absorbing liquids, shown at 64 exiting the apparatus 10 in the direction of arrow 65. The flexible sheet product 64 may then be rolled onto a spool, cut to a desired length, or otherwise conventionally processed. As is generally known in melt-blowing technologies, the molten polymer-based material 61 develops into a web of fibrous material 62 and cures almost simultaneously upon emerging from the sprayer 60. Polymer-based materials suitable for use in preparing the flexible sheet product 64 include, but are not limited to, polyolefins, such as, but not limited to, polyethylene and polypropylene. Other materials, such as UV stabilizers, dyes, pigments, surfactants, etc., may also be incorporated directly into the melt-blown microfibrous sheet materials during the melt-blowing process by blending the appropriate additive with the polymer prior to extrusion.

As a result of the competing vacuum systems 54 and 56 within the loft zone 58, the resultant sheet product 64 has increased loft. The thickness and loft of the sheet product 64 is generally determined by a combination of the distance between the rollers 20 and 30, the vacuum applied by the first 54 and second 56 vacuum systems, the angle at which the web of fibrous material 62 is pulled onto the first 46 and second 50 screens, and the distance of the sprayer 60 from the screens 46 and 50. By adjusting any or all of the above-identified factors, the loft and thickness of the resultant sheet product 64 may be varied. This eliminates making multiple single layer products to laminate together to achieve an absorbent sheet product having a desired thickness, and therefore eliminates the time consuming process of making "put up" rolls. The base weight of the flexible sheet product 64 is generally determined by the rotational speed of the first 46 and second 50 screens, which is controlled via the drive rollers 26 and 36, and the spray rate of the sprayer 60.

Figure 4:
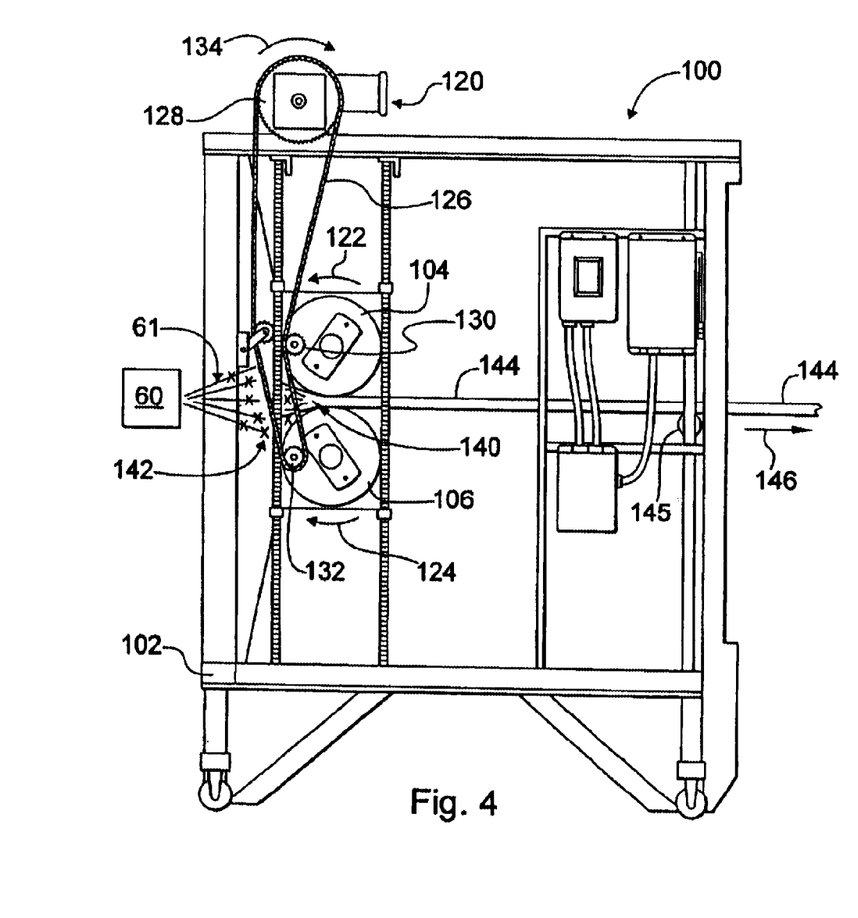
FIG. 4 is a side view of an apparatus for producing a flexible sheet product for absorbing liquids according to an alternate embodiment of the present invention.
Figure 5:
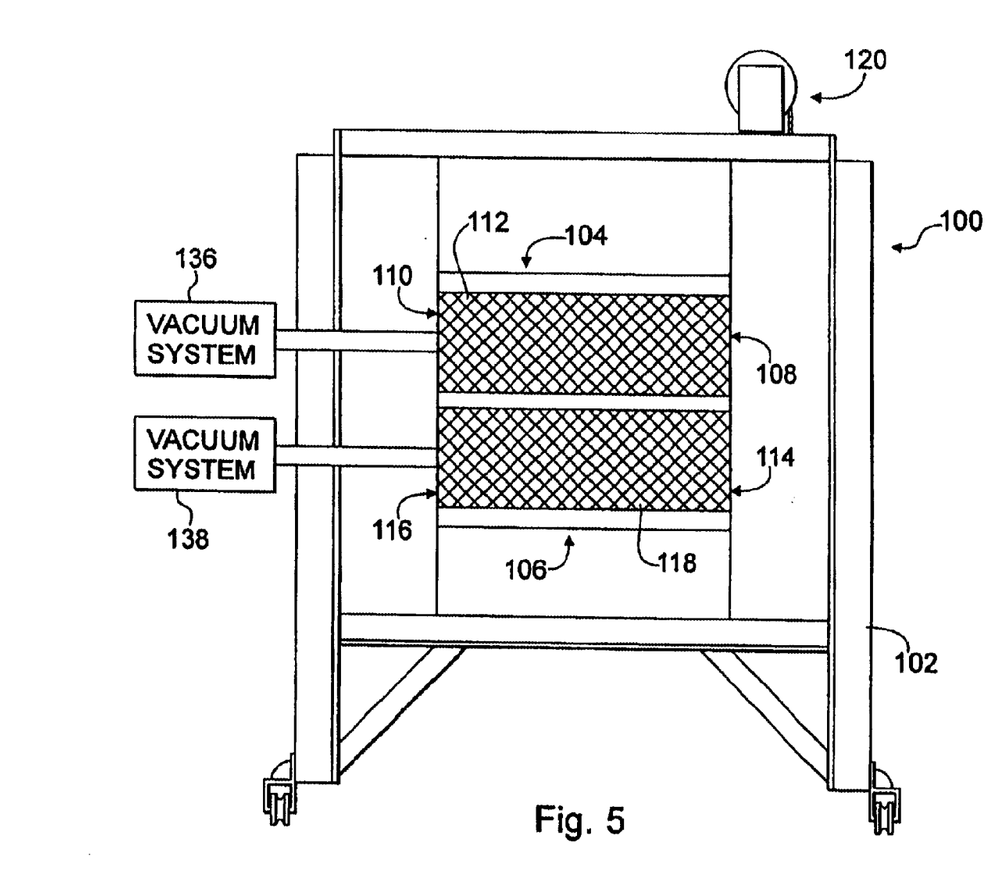
FIG. 5 is a front view of the inventive apparatus shown in FIG. 4.
Figure 6:
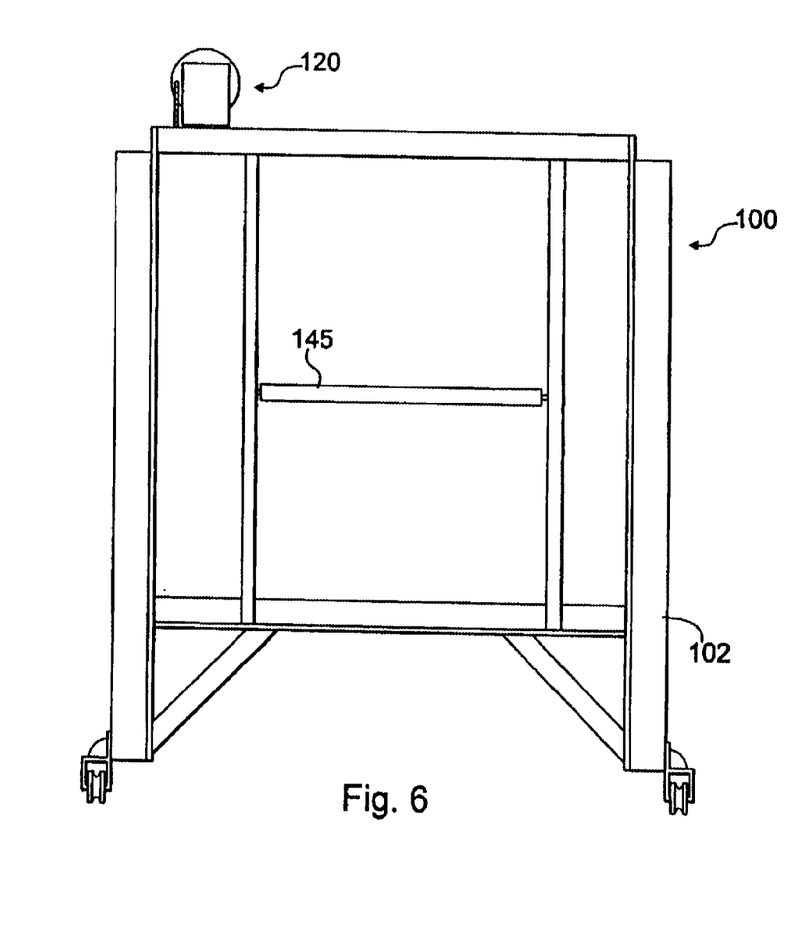
FIG. 6 is a back view of the inventive apparatus shown in FIG. 4.

Referring to FIGS. 4–6 an apparatus 100 is shown according to an alternate embodiment of the present invention for making flexible sheet products for absorbing liquids. In FIGS. 4–6, like elements of FIGS. 1–3 are indicated with the same reference number. The apparatus 100 includes a frame 102 supporting first 104 and second 106 drum assemblies. The first drum assembly 104 includes ends 108 and 110, and a generally cylindrical screen 112 connected therebetween. Similarly, the second drum assembly 106 includes ends 114 and 116, and a generally cylindrical screen 118 connected therebetween. The screens 112 and 118 may be made of polyester or steel and are approximately 30-mesh. Preferably, the first 104 and second 106 drum assemblies include condensers.

A motor and gearbox assembly 120 is operably connected to the first 104 and second 106 drum assemblies for rotation of the respective drum assembly in the direction indicated by arrows 122 and 124, respectively. Specifically, a chain 126 connects a drive gear 128 of the motor and gearbox assembly 120 to gears 130 and 132 on the ends 108 and 114 of the first 104 and second 106 drum assemblies, respectively. Rotation of the drive gear 128 in the direction indicated by arrow 134 effectuates rotation of the first 104 and second 106 drum assemblies in the directions indicated by arrows 122 and 124, respectively. In addition to being rotatably mounted to the frame 102, the first 104 and second 106 drum assemblies are adjustably mounted to the frame 102 such that they may be spaced further apart or closer to one another.

First 136 and second 138 vacuum systems are connected to the first 104 and second 106 drum assemblies, respectively. The vacuum systems 136 and 138 provide a vacuum within the respective drum assembly to draw air into the drum assembly through the respective screen. The first 104 and second 106 drum assemblies are preferably positioned one on top of the other creating a loft zone, shown generally at 140, therebetween where air is pulled substantially in opposite directions and into the screens 112 and 118. The loft zone 140 extends generally from a point where the first 104 and second 106 drum assemblies come together, i.e., the entrance to the loft zone 140, to a point sufficiently removed from the first 104 and second 106 drum assemblies so that the vacuum force is no longer present.

In the same manner as previously described with respect to FIGS. 1–3, the molten polymer-based material 61 is extruded out of the conventional sprayer 60 into a high velocity gaseous stream toward the first 104 and second 106 rotating drum assemblies at the entrance to the loft zone 140. The high velocity gaseous stream creates a turbulence which entangles the microfibers to form a web of fibrous material, shown generally at 142. The web of fibrous material 142 is deposited onto the screens 112 and 118 of the first 104 and second 106 rotating drum assemblies, respectively, via the suction created by the first 136 and second 138 vacuum systems, respectively. Since the first 104 and second 106 drum assemblies are generally cylindrical, the web of fibrous material 142 is pulled onto the first 104 and second 106 drum assemblies at an angle generally other than 90° relative thereto. By adjusting the size and position of the drum assemblies 104 and 106, this angle may be changed. As the web of fibrous material 142 enters the loft zone, it is pulled in substantially opposite directions by the first 136 and second 138 vacuum systems, with some of the fibers ending up on the first drum assembly 104 and some ending up on the second drum assembly 106, while at the same time remaining thermally linked together. As the thermally linked fibrous material moves through the loft zone 140, it cures to form a flexible sheet product for absorbing liquids, shown at 144 exiting the apparatus 100 over exit roller 145 in the direction of arrow 146. The flexible sheet product 144 may then be rolled onto a spool, cut to a desired length, or otherwise conventionally processed. As is generally known in melt-blowing technologies, the molten polymer-based material 61 develops into a web of fibrous material 142 and cures almost simultaneously upon emerging from the sprayer 60. Various polymer-based materials may be utilized in preparing the flexible sheet product 144, and may include various additives as previously described with respect to FIGS. 1–3.

As a result of the competing vacuums within the drum assemblies 104 and 106, the resultant sheet product 144 has increased loft. The thickness and loft of the sheet product 144 is generally determined by a combination of the distance between the drum assemblies 104 and 106, the vacuum applied by the vacuum systems 136 and 138, the angle at which the web of fibrous material 142 is pulled onto the screens 112 and 118, and the distance of the sprayer 60 from the drum assembles 104 and 106. By adjusting any or all of the above-identified factors, the thickness and loft of the resultant sheet product 144 may be varied.

While the present invention has been described with particular reference to the drawings, it should be understood that various modifications could be made without departing from the spirit and scope of the present invention.

I claim:

1. An apparatus for making a flexible sheet product for sorbing liquids, said apparatus comprising:
    a frame;
    a first drum assembly including a first, generally cylindrical screen, the first drum assembly mounted to the frame for rotational movement in a first rotational direction;
    a first vacuum within the first drum assembly for pulling air in a first direction into the first drum assembly;
    a second drum assembly including a second, generally cylindrical screen, the second drum assembly mounted to the frame for rotational movement in a second rotational direction opposite the first rotational direction; and
    a second vacuum within the second drum assembly for pulling air in a second direction, substantially opposite the first direction, into the second drum assembly,
    the first and second vacuums creating a loft zone between the first and second drum assemblies such that a molten polymer-based material blown into the loft zone is pulled in substantially opposite directions onto the first and second screens of the first and second drum assemblies, respectively, forming a flexible sheet product for sorbing liquids.

2. The apparatus of claim 1, wherein the first and second screens are made of polyester or steel.

3. The apparatus of claim 1, wherein the molten polymer-based material comprises melt blown microfibrous materials.

4. The apparatus of claim 1, wherein the molten polymer-based material is pulled onto the first and second screens of the first and second drum assemblies, respectively, at an angle other than 90° relative thereto.

5. The apparatus of claim 1, further comprising a motor and gearbox assembly operably connected to the first and second drum assemblies for adjusting the rotational speeds of the first and second drum assemblies.

6. The apparatus of claim 1, further in combination with a sprayer for blowing the molten polymer-based material into the loft zone.

7. The apparatus of claim 1, wherein the flexible sheet product for sorbing liquids comprises a nonwoven flexible sheet product.

8. The apparatus of claim 1, wherein the first and second drum assemblies comprise condensers.

9. A method for making a flexible sheet product for sorbing liquids, said method comprising the steps of:
providing first and second drum assemblies rotating in opposite rotational directions, the first and second drum assemblies including first and second generally cylindrical screens, respectively;
providing first and second vacuums behind the first and second drum assemblies, respectively, the first and second vacuums pulling air into the first and second drum assemblies through the first and second screens, respectively, and creating a loft zone between the first and second drum assemblies wherein air is pulled in substantially opposite directions;
blowing a molten polymer-based material into the loft zone, wherein the molten polymer-based material is pulled in opposite directions onto the first and second screens developing a web of fibrous material; and
curing the web of fibrous material to develop a flexible sheet product for sorbing liquids.

10. The method of claim 9, wherein the web of fibrous material is developed and cured substantially simultaneously.

11. The method of claim 9, wherein the first and second screens are made of polyester or steel.

12. The method of claim 9, wherein the developed flexible sheet product for sorbing liquids comprises a nonwoven flexible sheet product.

13. A method for making a flexible sheet product for sorbing liquids, said method comprising the steps of:
providing first and second condensers rotating in opposite rotational directions, the first and second condensers positioned to define a loft zone therebetween;
providing first and second vacuums within the first and second condensers, respectively, the first and second vacuums pulling air from the loft zone in substantially opposite directions into the first and second condensers, respectively;
blowing a molten polymer-based material into the loft zone, wherein the molten polymer-based material is pulled in opposite directions onto the first and second condensers developing a web of fibrous material; and
curing the web of fibrous material to develop a flexible sheet product for sorbing liquids.

14. The method of claim 13, wherein the molten polymer-based material is blown onto the first and second condensers at an angle other than 90° relative thereto.

15. The method of claim 13, wherein the first and second condensers include screens made of polyester or steel.

16. The method of claim 13, wherein the web of fibrous material is developed and cured substantially simultaneously.

17. The method of claim 13, wherein the molten polymer-based material comprises melt blown microfibrous materials.

18. An apparatus for making a flexible sheet product for sorbing liquids comprising:
a frame; and
first and second condensers rotatably mounted to the frame for rotation in first and second opposite rotational directions, respectively,
the first and second condensers including first and second vacuums, respectively, pulling air into the first and second condensers, respectively,
wherein the first and second vacuums create a loft zone between the first and second condensers wherein air is pulled in substantially opposite directions such that a molten polymer-based material blown into the loft zone is pulled in substantially opposite directions onto the first and second condensers forming a flexible sheet product for sorbing liquids.

19. The apparatus of claim 18, wherein the first and second condensers include screens made of polyester or steel.

20. The apparatus of claim 18, wherein the molten polymer-based material comprises melt blown microfibrous materials.

21. An apparatus of making a flexible sheet product for sorbing liquids, said apparatus comprising:
a first roller assembly;
a first screen operational with the first roller assembly for rotational movement in a first rotational direction;
a first vacuum disposed behind the first screen for pulling air in a first direction;
a second roller assembly;
a second screen operational with the second roller assembly for rotational movement in a second rotational direction opposite the first rotational direction; and
a second vacuum disposed behind the second screen for pulling air in a second direction substantially opposite that of the first direction,
the first and second vacuums creating a loft zone between the first and second screens such that a molten polymer-based material blown into the loft zone is pulled in substantially opposite directions onto the first and second screens forming a flexible sheet product for sorbing liquids.

22. A method for making a flexible sheet product for sorbing liquids, said method comprising the steps of:
providing first and second screens moving in opposite rotational directions;
providing first and second vacuums behind the first and second screens, respectively, the first and second vacuums pulling air into the first and second screens, respectively, and creating a loft zone between the first and second screens wherein air is pulled in substantially opposite directions;
blowing a molten polymer-based material into the loft zone, wherein the molten polymer-based material is pulled in opposite directions onto the first and second screens developing a web of fibrous material; and
curing the web of fibrous material to develop a flexible sheet product for sorbing liquids.

23. A method for making a flexible sheet product for sorbing liquids, said method comprising the steps of:
providing first and second screens moving in opposite rotational directions, the first and second screens defining a loft zone therebetween where the first and second screens are moving in a substantially parallel lateral direction and in close proximity to one another;
providing first and second vacuums behind the first and second screens, respectively, the first and second vacuums pulling air from the loft zone in substantially opposite directions into the first and second screens, respectively;
blowing a molten polymer-based material into the loft zone, wherein the molten polymer-based material is pulled in opposite directions onto the first and second screens developing a web of fibrous material; and curing the web of fibrous material to develop a flexible sheet product for sorbing liquids.

24. A method for making a flexible sheet product for sorbing liquids, said method comprising the steps of:

providing first and second competing vacuum systems pulling air in substantially opposite directions into first and second moving screens, respectively;

blowing a molten polymer-based material into the first and second competing vacuum systems, wherein the molten polymer-based material is pulled in substantially opposite directions onto the first and second moving screens developing a web of fibrous material; and curing the web of fibrous material to develop a flexible sheet product for sorbing liquids.

25. An apparatus for making a flexible sheet product for sorbing liquids, said apparatus comprising:

first and second competing vacuum systems pulling air in substantially opposite directions into first and second moving screens, respectively, wherein a molten polymer-based material blown into the first and second competing vacuum systems is pulled in substantially opposite directions onto the first and second moving screens developing a flexible sheet product for sorbing liquids.

* * * * *